No. 705,702. Patented July 29, 1902.
P. PONTHUS & L. THERRODE.
COLLIMATOR GYROSCOPE FOR OBTAINING ARTIFICIAL HORIZONS.
(Application filed Mar. 11, 1902.)
(No Model.)
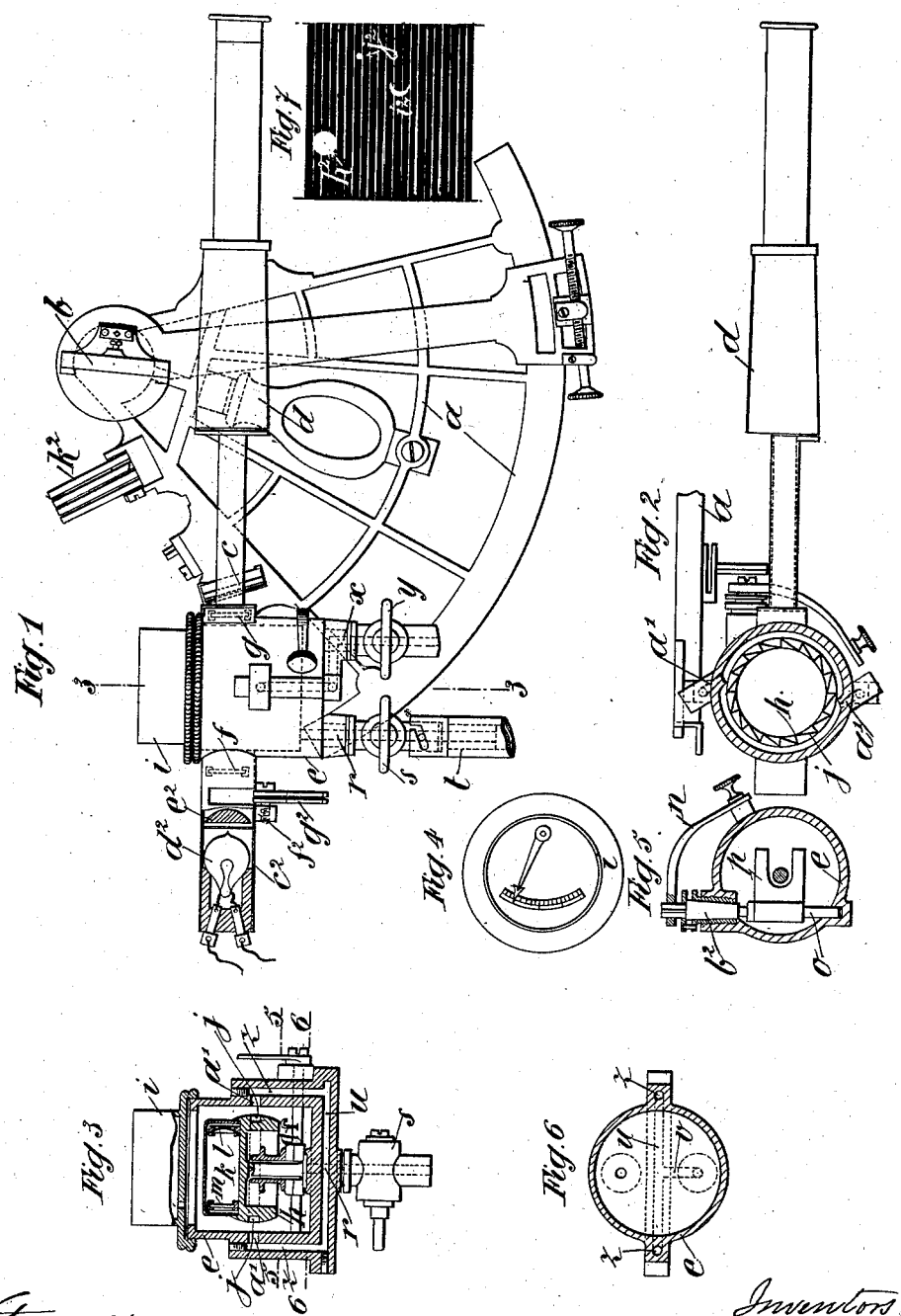

UNITED STATES PATENT OFFICE.

PROSPER PONTHUS AND LÉON THERRODE, OF PARIS, FRANCE.

COLLIMATOR-GYROSCOPE FOR OBTAINING ARTIFICIAL HORIZONS.

SPECIFICATION forming part of Letters Patent No. 705,702, dated July 29, 1902.

Application filed March 11, 1902. Serial No. 97,737. (No model.)

*To all whom it may concern:*

Be it known that we, PROSPER PONTHUS and LÉON THERRODE, citizens of the Republic of France, and residents of Considérant, No. 6 Rue Victor, Paris, France, have invented certain new and useful Improvements in Collimator-Gyroscopes for Obtaining Artificial Horizons, of which the following is a specification.

This invention relates to improvements in collimator-gyroscopes for obtaining artificial horizons.

In order to ascertain the exact position of a ship at sea by means of the sextant or octant the officers base their calculations on the inclination of the sun or a star on the horizon, at the same time taking the time of the year at which the operation of ascertaining the angle is carried out into consideration. For this purpose it is necessary that the line of demarcation between the sky and water should be apparent; but the said line is, on the other hand, often obscured by mist or fog during the day, even when the sun is visible, and at night it is nearly always invisible. In this case the ordinary sextant or octant is completely useless and the phenomenon may last for several days. At the present speed of vessels it is indispensable that this point should be ascertained several times in twenty-four hours, both during the day and night, even when the horizon is invisible, by making use of the sun during the day and of the moon or stars at night. For this purpose the French Admiral Fleuriain had the ingenious idea to add to the sextant a collimator-gyroscope, the axis of revolution of the said gyroscope occupying a vertical position at a sufficient speed. For this purpose the body of the gyroscope is provided with two diametrically-opposed apertures, the center of each of which is level with the axis of the collimator. Each of the said apertures is provided with a suitably-shaped lens, so that the focus of the one lies in the center of the other. Moreover, each of the said lenses carries a series of horizontal black marks or lines for facilitating the observation, the space between each line corresponding to any unit of angular measurement.

The operation consists in determining the angle which the star observed forms with the plane passing through the eye of the operator and one of the horizontal marks or lines on the lenses and to which line the lower part of the circumference of the star appears to be tangential. There subsequently remains only to determine the space occupied by the line to which the star appeared tangential below and above the median line, which is drawn in a different manner and generally more apparent than the others. However, the stars observed, and specially the nocturnal ones, show up very badly on the colorless or white background of the gyroscope-lenses, thus impairing the precision of the operation and in most cases rendering the observation impossible.

In order that the gyroscope may retain the speed of revolution imparted to it for a considerable time, it is necessary that it should revolve in a vacuum. The gyroscope operating in a vacuum as hitherto used is arranged in a case devoid of air, and in order to obtain its revolution a rotary motion is imparted to the case and the gyroscope contained therein. By means of an interior mechanism the gyroscope can be made, as it were, to form one with the case when the latter revolves in one direction, whereupon on the whole revolving at a sufficient speed the case is stopped, while the gyroscope continues its revolution alone.

The mechanism by which the apparatus is revolved is so complicated and produces so many miscalculations that many people prefer a gyroscope revolving in a case to which the air has free access, which permits the gyroscope to be easily put into operation. Moreover, if the vacuum is perfect when the apparatus is new such is not always the case after a certain time, when the air often penetrates so that the gyroscope no longer revolves in the vacuum and it is very difficult to actuate it.

When the gyroscope operates in the open air, it is provided in its horizontal median plane with a series of vanes, into which air is forced by means of any suitable apparatus. However, the said vanes are themselves a cause of resistance when the air-feed ceases, since they beat the surrounding air and cause the duration of the revolution of the apparatus to be greatly reduced. Further, in order to ascertain the point at night by making use of the stars or moon a light must be placed at the back of the gyroscope in such a manner that the black lines show up on the lenses on which they are drawn. Owing to the frequent wind at sea it is, however, impossible to obtain a flame which does not flicker and to keep it in a fixed position with regard to the collimator-gyroscope unless it forms part of the apparatus. All these inconveniences result in preventing the apparatus rendering such services as could rightly be expected from it, and very few naval officers use it.

The present improvements in the apparatus allow of an absolutely clear visibility of the star to be observed in order to ascertain the point during the day as well as at night and of very easily putting the gyroscope into operation, at the same time causing it to revolve in a vacuum after being actuated.

In order to render the present improvements perfectly clear, we have annexed to the present specification drawings, in which—

Figure 1 is an elevation, partly in section, of a sextant to which the present improved gyroscope has been added. Fig. 2 is a partial plan view of the same sextant with the gyroscope in horizontal section. Fig. 3 is a vertical section on line 3 3 of Fig. 1. Fig. 4 is a plan view of the upper part of the gyroscope with the vacuum-indicator. Fig. 5 is a horizontal section on line 5 5 of Fig. 3. Fig. 6 is a section on line 6 6 of Fig. 3. Fig. 7 shows, on an enlarged scale, a view of the gyroscope-glass on which the horizontal lines are drawn and on which the sun, moon, or stars can be seen.

$a$ is the body of the sextant; $b$ and $c$, the mirrors, which permit of seeing on the special screen, which will be hereinafter described and which is carried by the gyroscope, the star utilized for the determination of the point by means of the collimator $d$.

The case $e$, containing the gyroscope, is provided with two apertures $f$ and $g$, arranged, as usual, in the axis of one of the halves of the collimator $d$ and permitting observation through the gyroscope $h$, as shown in Figs. 2 and 3. The aperture $g$ is provided with a transparent glass pane and the aperture $f$ with a roughened glass pane in order to leave passage for a diffused light and so as not to present any glittering points.

The case $e$ is provided with a screw-cover $i$, in which an aneroid indicating the vacuum produced in the case $e$ is arranged, as shown in Figs. 1, 3, and 4.

The gyroscope $h$ carries in its horizontal central part vanes $j$ for producing its revolution. It is mounted, as usual, on a pivot of hard material carried by a socket, which is also made of hard material and formed in one piece with the case $e$ or fixed thereon. Above the gyroscope is a space $k$, provided with two diametrically-opposed windows, in which the lens $l$ and glass pane $m$ are respectively arranged. The lens $l$ is transparent and convex on its outer side to the axis of revolution of the apparatus in such a manner as to place the pane $m$ in its focus. The said glass pane $m$ is plain and black, except that the horizontal lines drawn thereon are transparent. The said lines are as fine as possible and are obtained either by photographic means or by coating the pane $m$ with a black layer on which the lines are drawn by means of a very fine point, which may or may not belong to a dividing-machine. The lens $l$ and pane $m$ have their centers arranged in a horizontal plane passing through the axis of the apertures $f$ and $g$ and case $e$.

The lever $n$, mounted on the axle $o$, is adapted to raise the gyroscope from the exterior by means of the fork $p$ when the apparatus is out of operation, and the flexible and bent wire or spring $q$, fixed at its lower end on the axle $o$, gives precession to the gyroscope—that is to say, it imparts thereto a conical oscillation the length of which is in proportion to the speed of revolution of the part $h$, and thus serves to determine the latter.

When a body turns upon itself vertically, it tends to preserve its axis vertical; but if it is disturbed by an exterior momentary force the vertical axis describes a cone of which the apex is in the base of the turning body. The secondary conical movement thus produced is more rapid as the body turns less quickly, and, on the contrary, more slow as the body turns more quickly. This secondary conical movement is called "precession," and when the operator of the gyroscope wishes to know if his apparatus has a sufficiently rapid rotation for the duration of his operation with the lever $n$ of a single flexible wire $q$ he makes a little momentary pressure upon the side of the lower face of the gyroscope, which then takes the oscillatory conical movement called "precession," and the extent of this movement indicates to him the rapidity of rotation of the apparatus, which little by little finally retakes its absolute vertical position.

The axle $o$ carries a conical part $b^2$, passing through a sleeve in the case $e$, by means of which the said axle can tightly pass through the wall of the case, and when the vacuum is produced in the interior of the case $e$ the outer atmospheric pressure tends to further assure the tightness.

The case $e$ carries at its lower part a tube $r$, opening into the interior of the case and adapted to be closed by a cock $s$, on which may be arranged a conduit $t$, communicating with any suitable apparatus for producing a vacuum, such as a pump, steam-engine, condenser, and the like.

The bottom of the case $e$ is provided with two conduits or passages $u$ and $v$, parallel to its surfaces and perpendicular to each other, as shown in Fig. 6. The passage $x$ in a tube provided with a cock $y$ opens at its upper end into the conduit $v$ and at its lower end into the open air. Two vertical passages $z\,z$, made in two projecting portions of the case $e$, place the conduit $u$ into communication with the two orifices $a'\,a'$, which are arranged tangentially to the vane carrying part of the gyroscope and perpendicularly to the latter.

In the prolongation of the axis passing through the center of the two apertures $g$ and $f$ and at a suitable distance from the latter is placed a tube $c^2$, containing a small electric lamp $d^2$ and a lens $e^2$, the focus of which lies in the center of the luminous part of the lamp. This tube $c^2$ further carries a pivot $f^2$, on which frames provided with colored glass panes $g^2$ are pivoted and adapted to be interposed between the lens $e^2$ and the rough glass pane $f$. This arrangement is for the purpose of allowing well-diffused light only to penetrate during the night into the interior of the case $e$, as by the arrangement of the lens $e^2$, frames $g^2$, and glass pane $f$ the intensity and color of the said diffused light are adapted to be suitably modified in order that the star observed may clearly show up on the black surface of the glass pane $m$ and even on the lines drawn thereon, which appear luminous.

The operation of the apparatus is as follows: To put the gyroscope into operation, the lever $n$ is placed in its lower position—that is to say, in such a position that the pivot of the gyroscope bears on its socket or bearing and the spring $q$ does not touch the lower part of the rotary apparatus. The two cocks $s$ and $y$ are then opened and the tube $t$ connected with an air-pump or other exhauster. On the latter being operated the air is drawn out of the interior of the space $e$, where it is replaced in proportion by another equal quantity of air admitted by the cock $y$. The air thus drawn into the interior of the box $e$ passes through the two orifices $a'\,a'$ and, striking the vanes of the gyroscope $h$, causes it to revolve in the same direction, and in proportion as the action of the air-pump is continued the speed of revolution of the gyroscope is increased, and on the said speed reaching a sufficient limit the cock $y$ is closed and the operation of the air-pump continued, which then produces a vacuum in the interior of the case $e$, the degree of vacuum being indicated by the pointer on the outside of the cover $i$. On the vacuum reaching a suitable limit the cock $s$ is closed, whereupon the gyroscope will continue its revolution at a sufficient speed and for a sufficient time to enable the operation of taking the bearing to be carried out. If on using the sextant in the ordinary manner the operator at this moment looks into the collimator $d$, the glass pane $m$ will appear as continuous, because of the great speed of revolution of the gyroscope, and the horizontal lines drawn on said pane, the ground of which is black, will be rendered luminous either by the daylight or by the light from the lamp $d^2$, so that the operator is enabled to see them very clearly. The star observed and suitably reflected by the mirrors $b$ and $c$ will appear clearly shown up on the black ground, as shown in Fig. 7, in which $h^2$ represents the sun, $i^2$ the moon, and $j^2$ a star. The operator has then only to note to which of the horizontal lines the star observed had its lower edge tangential in order to add to or deduct from the angle ascertained by means of the sextant, that to which the number of divisions corresponds above or below the horizontal median line arranged between the latter and that to which the lower edge of the star appeared tangential.

$k^2$ represents colored glass screens arranged as in ordinary sextants in order to be inserted at will between the two mirrors $b$ and $c$, so as to deaden the light of the sun.

It is obvious that the parts constituting our invention may be constructed of any suitable material and their shape and dimensions modified without departing from the principle of the invention.

Having now particularly described and ascertained the nature of our said invention and in what manner the same is to be performed, we declare that what we claim is—

1. In a collimator-gyroscope operating in vacuum for obtaining an artificial horizon, a cylindrical hermetical case provided with two diametrically opposite windows, one of the windows of the said hermetical case being closed by a transparent pane, the other window being closed by a roughened glass, the window with the transparent pane being placed at the front extremity of the collimator, a cock placed at the center of the hermetical case upon which the gyroscope is mounted, the gyroscope being provided at the middle of its periphery with vanes opposite which are two horizontal conduits pierced obliquely in the wall of the hermetical case, the gyroscope being provided with a chamber, the said chamber being pierced with two diametrically opposite windows of which the axis is in the same horizontal plane as that of the windows of the hermetical case, a lens located opposite one of the windows of the chamber surmounting the gyroscope, and a blackened pane upon which are traced transparent lines placed opposite the other window and at the focus of the lens, substantially as described.

2. In a collimator-gyroscope operating in vacuum for obtaining an artificial horizon, a cylindrical hermetical case provided with two diametrically opposite windows, a cock placed at the center of the hermetical case upon which the gyroscope is mounted, the gyroscope being provided with vanes at the middle of its periphery opposite which are two horizontal conduits pierced obliquely in the wall of the hermetical case, two vertical conduits pierced in the wall of the hermetical case in connection at their upper extremities with the horizontal conduits pierced obliquely in the wall of the hermetical case and at their lower extremities with a conduit pierced horizontally in the enlargement of the base of the hermetical case, a conduit pierced horizontally in the enlargement of the base and in perpendicular connection at one of its extremities with the one already in connection with the two vertical conduits and in connection at its other extremity with a conduit pierced perpendicularly in the base of the hermetical case and upon which is disposed a cock, a conduit pierced perpendicularly in the base of the hermetical case in connection with the interior of said case, a cock located in this conduit and an air-tube mounted upon the said cock, substantially as described.

3. In a collimator-gyroscope operating in vacuum for obtaining an artificial horizon, a cylindrical hermetical case provided with two diametrically opposite windows, one of the windows of the said hermetical case being closed by a transparent pane and the other by a roughened pane, the window with the transparent pane being placed at the front extremity of the collimator, a cock placed at the center of the hermetical case upon which the gyroscope is mounted, the gyroscope being provided at the middle of its periphery with vanes opposite which are two horizontal conduits pierced obliquely in the wall of the hermetical case, the gyroscope being provided with a chamber, the said chamber being pierced with two diametrically opposite windows of which the axis is in the same horizontal plane as that of the windows in the hermetical case, one of the windows being opposite a blackened glass at the focus of the lens placed opposite the other window, and an electric lamp inclosed in a tube and placed in the focus of the lens located upon the same line as the center of the window of the hermetical chamber closed by roughened glass, substantially as described.

4. In a collimator-gyroscope operating in vacuum for obtaining an artificial horizon, a cylindrical hermetical case provided with two diametrically opposite windows, one of the windows of the said hermetical case being closed by a transparent pane and the other by a roughened glass, the window having the transparent pane being placed at the front extremity of the collimator, a cock placed at the center of the hermetical case upon which the gyroscope is mounted, the gyroscope being provided at the middle of its periphery with vanes opposite which are two horizontal conduits pierced obliquely in the wall of the hermetical case, the gyroscope being provided with a chamber, the said chamber being pierced with two diametrically opposite windows of which the axis is in the same horizontal plane as that of the windows of the hermetical case, one of the windows being opposite a blackened glass in the focus of the lens located opposite the other window, the blackened glass, an electric lamp inclosed in a tube and placed in the focus of a lens located in the same line as the center of the window of the hermetical chamber which is closed by a roughened glass, an axle carried by the tube which contains the electric lamp and, articulated upon the said axle, panes of various colored glasses adapted to be placed one on the other between the roughened glass of the hermetical cylindrical case and the lens at the focus of which the electric lamp is placed, substantially as described.

5. In a collimator-gyroscope operating in vacuum for obtaining an artificial horizon, a cylindrical hermetical case provided with two diametrically opposite windows, one of the windows of the said hermetical case being closed by a transparent pane, the other window being closed by a roughened glass, the window with the transparent pane being placed at the front extremity of the collimator, a cock placed at the center of the hermetical case upon which the gyroscope is located, the gyroscope being furnished with vanes at the middle of its periphery opposite which are two horizontal conduits pierced obliquely in the wall of the hermetical case, the gyroscope being provided with a chamber, the said chamber being pierced with two diametrically opposite windows of which the axis is in the same horizontal plane as that of the windows of the hermetical case, a lens placed opposite one of the windows of the chamber surmounting the gyroscope, a blackened glass upon which are traced transparent lines located opposite the other window and at the focus of the lens, an axle journaled in the lower part of the cylindrical hermetical case, this axle being furnished with a conical journal located in the wall of the hermetical case which it crosses, the larger base of the conical journal being on the exterior of the case while the other cylindrical journal of said axis is located in a cavity in the wall of the hermetical case, an operating-lever keyed upon the squared end of the axle adjacent to the conical journal, and a fork and a bent wire fixed upon the axle with two journals, substantially as described.

6. In a collimator-gyroscope operating in vacuum for obtaining an artificial horizon, a cylindrical hermetical case provided with two diametrically opposite windows, a chamber placed at the center of the hermetical case upon which the gyroscope is mounted, the gyroscope being provided with vanes at the middle of its periphery opposite which are two horizontal conduits pierced obliquely in the wall of the hermetical case, two vertical conduits pierced in the wall of the hermetical case in connection at their upper extremity with the horizontal conduits pierced obliquely in the wall of the hermetical case and at their lower extremity with a conduit pierced horizontally in the base of the hermetical case, a conduit pierced horizontally in the base and in perpendicular connection by one of its extremities with the one already in connection with the two vertical conduits, and in connection at its other extremity with a conduit pierced perpendicularly in the base of the hermetical case and upon which a cock is mounted, a conduit pierced perpendicularly in the base of the hermetical case in connection with the interior of this case, a cock located upon this conduit and an air-tube mounted upon the said cock, the gyroscope being provided with a chamber mounted upon the upper part of the hermetical case in communication with the interior of the latter, and a vacuum-indicator placed on the interior of the said chamber, substantially as described.

In testimony whereof we have signed our names to this specification in the presence of two subscribing witnesses.

PROSPER PONTHUS.
   LÉON THERRODE.

Witnesses:
 LÉON BORAMÉ,
 PAUL BACARD.